United States Patent [19]

Dequasie et al.

[11] Patent Number: 4,580,189
[45] Date of Patent: Apr. 1, 1986

[54] DRY METALLIZED FILM CAPACITOR

[75] Inventors: Andrew E. Dequasie, Pownal, Vt.; Herbert L. Rice, Williamstown, Mass.

[73] Assignee: Sprague Electric Company, North Adams, Mass.

[21] Appl. No.: 710,897

[22] Filed: Mar. 12, 1985

[51] Int. Cl.⁴ .......................... H01G 1/10; H01G 1/13
[52] U.S. Cl. ...................................... 361/272; 361/275
[58] Field of Search .................... 361/272, 323, , 275; 174/52 PE, 52 S

[56] References Cited

U.S. PATENT DOCUMENTS

| 3,304,473 | 2/1967 | Netherwood et al. | 317/256 |
| 4,317,158 | 2/1982 | Dequasie | 361/272 |
| 4,317,159 | 2/1982 | Dequasie | 361/318 |

Primary Examiner—L. T. Hix
Assistant Examiner—Douglas S. Lee

[57] ABSTRACT

A dry metallized film capacitor which includes an interrupter is potted with a plasticized urethane containing unreacted isocyanate groups. Sufficient plasticizer is used so that the potting material is soft enough to permit functioning of the interrupter and is also viscous enough to remain in place to prevent spillage under leakage or rupture conditions.

4 Claims, 1 Drawing Figure

DRY METALLIZED FILM CAPACITOR

BACKGROUND OF THE INVENTION

This invention concerns a dry metallized film capacitor which includes an interrupter and is potted with a plasticized urethane containing unreacted isocyanate groups. Sufficient plasticizer is used so that the potting material is soft enough to permit functioning of the interrupter and is also viscous enough to remain in place to prevent spillage under leakage or rupture conditions.

The use of an interrupter in a metallized film capacitor is well-known. Its function is to force the electrode tabs to be disconnected from the terminals in the case of rapid pressure build-up within the capacitor. When such pressure builds up, the capacitor cover bearing the terminals bulges; since the ends of the terminals are force-fit through holes in the interrupter, the upward movement of the cover carries the interrupter with it, breaking the connection of the tabs from the bottoms of the respective terminals.

Potting materials have been used in wrapped capacitors, in encapsulated units, and as fill in plastic-cased units. In these applications, the potting material serves to protect the unit from end-fill material and fill irregular spaces or provide vibration protection. Heretofore, potting compounds have not been used in dry metallized film capacitors requiring a fail-safe interrupter as they have not been soft enough to prevent uneven pressure buildup, e.g., by trapping a pocket of gas, and, as a result, interfered with the proper operation of the interrupter.

SUMMARY OF THE INVENTION

This invention relates to a dry metallized film capacitor which includes an interrupter and a plasticized urethane potting material. Sufficient plasticizer is used so that the material is soft enough so that if there is a rapid pressure buildup, gas can escape through or around the material and not interfere with the proper operation of the interrupter. However, the potting material must still be viscous enough to remain in place to prevent spillage under leakage or rupture conditions.

The preferred urethanes are those taught by Andrew Dequasie in U.S. Pat. Nos. 4,317,158 and 4,317,159, both issued Feb. 23, 1982, and preferably used is a diphenylmethane diisocyanate prepolymer having 19 to 23 wt % unreacted isocyanate groups. A plasticizer which is compatible with the capacitor materials is used and is, preferably, diallylphthalate, isopropyl biphenyl, diisononylphthalate, or dioctylphthalate.

BRIEF DESCRIPTION OF THE DRAWINGS

The sole FIGURE shows a metallized film capacitor of the present invention.

DESCRIPTION OF THE PREFERRED EMBODIMENTS

Figure 1:
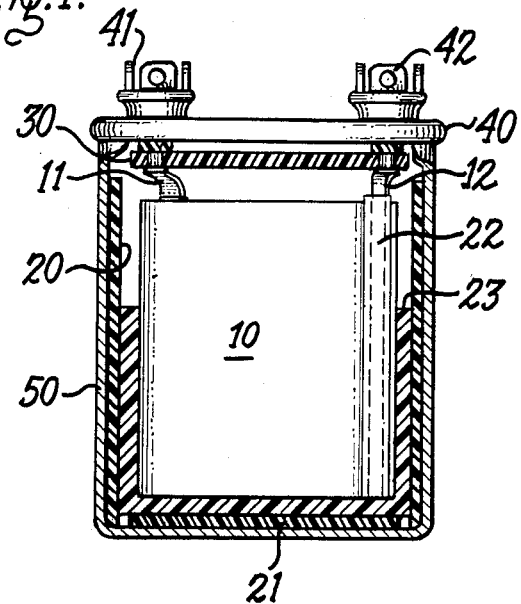

A rolled metallized film capacitor 10 has two electrodes with associated electrode tabs 11 and 12, respectively. Section 10 is insulated from the sides of the metal housing 50 by plastic insulating wrap 20 and from the bottom of metal housing 50 by plastic insulating disc 21. Tab 12 extends from the bottom of section 10 and is encased in plastic sheath 22 to insulate it from section 10.

Plasticized urethane potting compound 23 fills at least one-half the space between section 10 and insulation 20, 21. This material must be soft enough so that if there is a rapid pressure buildup, the pressure will build up uniformly throughout housing 50, and interrupter 30 will function to disconnect at least one of the electrode tabs 11, 12 from the bottom of at least one terminal 41, 42 which extend through cover 40 and interrupter 30 in a known manner.

If the potting material is not soft enough to allow gas to escape around it, e.g., between the potting material and the section and/or the plastic wrap, then a pocket of gas could be trapped by the potting compound leading to the rupture of the lower part of the can with the capacitor still connected to the circuit containing it.

While potting compound 23 must be deformable enough to allow any pressure buildup to be uniform, the potting compound 23 must be viscous enough so there will be no liquid leak or spill under rupture conditions. In other words, the capacitor for all intents is a dry unit.

The potting compound is added to the capacitor in an uncured state after plastic disc 21 and wrap 23 are in place. Section 10 is added displacing potting compound 23 so that it fills at least one-half the free space in the capacitor. The units are cured at 85° C. for 15 hours to set-up the potting compound.

The urethane has unreacted isocyanate groups which will scavange any moisture which is present or finds its way into the unit, thus prolonging capacitor life.

EXAMPLE

AC capacitors metallized with an aluminum-copper alloy metallization and rated at 7.5 $\mu$F were subjected to life testing at 500V AC and 80° C. Of the 10 units tested, 5 were half-full of the plasticized potting compound, and 5 were filled to just above the top surface of the section, or full. The potting compound consisted of a diphenylmethane diisocyanate prepolymer mixed with one-half the stoichiometric amount of polyol and with an amount of diisononylphthalate plasticizer equal to the weight of diphenyl methane diisocyanate prepolymer plus polyol.

These 10 units were subjected to AC life testing at 500V AC and 80° C. There was no difference between the half-filled and full units. After 100 hrs, average capacitance loss was 0.44%, after 250 hrs it was 0.86%, after 575 hrs it was 1.06%, and after 901 hrs it was 0.96%. These last two values are essentially the same and within measurement experimental error.

A similar 16 units were subjected to failure tests to ascertain whether or not the potting material would interfere with interrupter function. A DC voltage well above the rated voltage is applied to produce a dead short, then AC voltage is applied to the shorted units until the interrupter works or the can blows out. Of the 16, 8 healed or cleared themselves. Of the remaining 8, the interrupter worked before the can blew out.

Again, there was no difference between half-full and full units. Because of economics, a half-fill is preferred; diisononylphthalate is preferred for economic reasons over other plasticizers, e.g., diallylphthalate or isopropyl biphenyl.

What is claimed is:

1. A dry capacitor comprising a wound section having two contiguously wound metallized film electrodes each bearing an electrode tab and located in a housing, a cover sealed to said housing, an interrupter located between an end of said section and said cover and having holes therein, one of said electrode tabs being connected to an end of one of said terminals passing through a hole in said interrupter, said second tab being connected to an end of said second of said terminals passing through another hole in said interrupter, and a potting compound filling at least one-half of a volume between said section, said housing, and said interrupter, said potting compound consisting essentially of a plasticized urethane containing unreacted isocyanate groups.

2. A capacitor according to claim 1 wherein sufficient plasticizer is used so that said urethane potting meterial is soft enough to permit the proper functioning of said interrupter but viscous enough to remain in place to render such capacitor incapable of leaking and spilling fluid.

3. A capacitor according to claim 1 wherein said urethane is a diphenylmethane diisocyanate prepolymer partially cured with a polyol and is plasticized with a material selected from the group of diallylphthalate, isopropyl biphenyl, and diisononylphthalate.

4. A capacitor according to claim 3 wherein said potting compound is a plasticized urethane obtained by reacting an isocyanate prepolymer with approximately one-half the stoichiometric amount of a polyol and plasticized with an amount of diisononylphthalate equal to the weights of said isocyanate prepolymer and said polyol.

* * * * *